(12) United States Patent
Hallemeier et al.

(10) Patent No.: US 11,175,420 B2
(45) Date of Patent: Nov. 16, 2021

(54) METHOD AND DEVICE FOR TELEMETRY IN ACOUSTIC ARRAYS TECHNICAL FIELD

(71) Applicant: Northrop Grumman Systems Corporation, Falls Church, VA (US)

(72) Inventors: Peter F Hallemeier, East Hartford, CT (US); Alan M Heins, East Hartford, CT (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 444 days.

(21) Appl. No.: 16/189,412

(22) Filed: Nov. 13, 2018

(65) Prior Publication Data

US 2020/0150301 A1 May 14, 2020

(51) Int. Cl.
*G01V 1/22* (2006.01)
*G01V 1/38* (2006.01)
*G01D 5/353* (2006.01)

(52) U.S. Cl.
CPC ......... *G01V 1/226* (2013.01); *G01D 5/35316* (2013.01); *G01D 5/35377* (2013.01); *G01V 1/38* (2013.01)

(58) Field of Classification Search
CPC . G01V 1/226; G01D 5/35316; G01D 5/35377
See application file for complete search history.

(56) References Cited

U.S. PATENT DOCUMENTS

| | | | |
|---|---|---|---|
| 5,675,674 A * | 10/1997 | Weis | G01H 9/004 385/12 |
| 5,808,779 A | 9/1998 | Weiss | |
| 5,898,517 A | 4/1999 | Weis | |
| 8,527,849 B2 | 9/2013 | Jakab et al. | |
| 8,537,849 B2 | 9/2013 | Holt | |
| 9,945,979 B2 | 4/2018 | Stokely et al. | |
| 2006/0076476 A1* | 4/2006 | Thingbo | G01D 5/35387 250/227.23 |
| 2009/0122319 A1* | 5/2009 | Ronnekleiv | G01D 5/35312 356/477 |
| 2010/0200744 A1* | 8/2010 | Pearce | G01V 8/16 250/268 |

(Continued)

OTHER PUBLICATIONS

International Search Report in related PCT Application No. PCT/US2019/043610, dated Oct. 28, 2019, 12 pages.

(Continued)

*Primary Examiner* — Ian J Lobo
(74) *Attorney, Agent, or Firm* — McCracken & Gillen LLC (57) ABSTRACT

A data telemetry system and method digitizes acoustic sensor data. Acoustic sensor data is digitized and used to apply strain to a series of Fiber Bragg Gratings (FBGs) in a fiber. Each FBG is assigned a nominal wavelength. A wavelength interrogator launches wavelengths into the fiber and scans the reflected wavelengths from the FBGs. A data telemetry rate of at least 5 kHz may be achieved. Acoustic sensors may be part of undersea acoustic sensing arrays with large element counts having reduced system cabling and improved Size, Weight and Power (SWaP). The system and method realizes low power loss per array element and efficient multiplexing of many data streams in a small form factor.

20 Claims, 4 Drawing Sheets

(56) References Cited

U.S. PATENT DOCUMENTS

| | | | |
|---|---|---|---|
| 2012/0227504 A1* | 9/2012 | Goldner | G01H 9/00 |
| | | | 73/655 |
| 2013/0113629 A1* | 5/2013 | Hartog | G01D 5/35303 |
| | | | 340/853.2 |
| 2013/0275055 A1 | 10/2013 | Hansen et al. | |
| 2015/0369731 A1 | 12/2015 | Taverner et al. | |
| 2018/0196152 A1* | 7/2018 | Karabacak | G01V 1/201 |

OTHER PUBLICATIONS

Iocco et al., "Bragg Grating Fast Tunable Filter for Wavelength Division Multiplexing", Journal of Lightwave Technology, vol. 17, No. 7, Jul. 1999, pp. 1217-1221.

Buric, et al., "Piezo-electric tunable fiber Bragg grating diode laser for chemical sensing using wavelength modulation spectroscopy," Optics Express, vol. 14, No. 6, Mar. 20, 2006, pp. 2178-2183.

Inui et al., "Highly efficient tunable fiber Bragg grating filters using multilayer piezoelectric transducers", Optics Communications, vol. 190, 2001, pp. 1-4.

\* cited by examiner

METHOD AND DEVICE FOR TELEMETRY IN ACOUSTIC ARRAYS TECHNICAL FIELD

TECHNICAL FIELD

Various example embodiments relate generally to data telemetry and more particularly to optical fiber telemetry for use in acoustic sensing arrays.

BACKGROUND

Acoustic sensing arrays are a critical technology in wide variety of applications and have been deployed for many years. One application of these systems is infrastructure for undersea communications and surveillance, where the system must operate for long periods of time under intense pressure with high reliability. Current systems are based on electronic technology and include data telemetry based on electrical signaling over twisted pair copper wiring. The heavy weight of copper cabling per unit length requires large surface vessels for deployment, prohibiting covert deployment with small undersea assets. Further, the copper cables suffer substantial signal loss per unit length. The power loss, multiplexing limitations, weight limitations, and length limitations lead to demanding cabling requirements and limit the element count and length of an acoustic sensing array.

Current systems also include all-optical systems, which incorporate optical sensors. To date, these systems have required very demanding laser technology and have not met cost point requirements and thus are not widely used.

Providing for future expandability (scalability) so that sensors and other functions may be added to the architecture is also highly desirable. Further, the system reliability of the array is of paramount importance. Historically, optical architectures relying on many active optical devices have not been as reliable as electronic solutions. Thus, there is a need for a scalable acoustic sensing array with improved optical data telemetry and high reliability which can then leverage the reduced system and cabling SWaP (Size, Weight and Power) of optical telemetry.

SUMMARY

A data telemetry system and method are described. One embodiment includes undersea acoustic sensing arrays with large element counts having reduced system cabling and therefore, improved Size, Weight and Power (SWaP). The system and method realize low power loss per array element and efficient multiplexing of many data streams in a small form factor by leveraging the best of both electronic and optical technologies.

Example embodiments encompass a system including a plurality of sensors, each comprising an acoustic sensor and electronics for digitizing an output of the acoustic sensor in accordance with a master clock that develops clock cycles; a fiber further comprising a plurality of Fiber Bragg Gratings (FBGs) along its length, wherein each of said plurality of FBGs is operatively coupled to a corresponding sensor of the plurality of sensors and each FBG having a Bragg wavelength that varies in as associated wavelength range with strain in the fiber proximate the FBG; a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles; and a swept wavelength interrogator coupled to an end of the fiber for sending a plurality of wavelengths into the fiber and receiving reflected wavelengths from the plurality of FBGs in accordance with the master clock during at least a portion of the particular plurality of successive clock cycles.

Another embodiment encompasses an undersea acoustic sensing system including a shore control station; an undersea main trunk line operatively coupled to the shore control station; and a plurality of interconnect units operatively coupled between said undersea main trunk line and a sensor array, said sensor array further including a plurality of sensors, each comprising an acoustic sensor and electronics for digitizing an output of the acoustic sensor in accordance with a master clock that develops clock cycles; a fiber comprising a plurality of Fiber Bragg Gratings (FBGs) along its length, wherein each of said plurality of FBGs is operatively coupled to a corresponding sensor of the plurality of sensors and each FBG having a Bragg wavelength that varies in an associated wavelength range with strain in the fiber proximate the FBG; a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles; and a swept wavelength interrogator coupled to an end of the fiber for sending a plurality of wavelengths into the fiber and receiving reflected wavelengths from the plurality of FBGs in accordance with the master clock during at least a portion of the particular plurality of successive clock cycles.

In either of the above embodiments, the master clock defines a bit period wherein a wavelength power spectrum of all of the plurality of FBGs is sampled.

In any of the above embodiments, the acoustic sensor further comprises a piezoelectric sensor. In a further embodiment, each FBG is assigned a nominal wavelength band separated by guard bands.

In any of the above embodiments, the plurality of sensors comprises at least 100 sensors.

In yet another embodiment, the wavelength interrogator further comprises a swept wavelength interrogator with a sweep speed of at least 5 kHz.

Any of the above embodiments, further including a power source coupled to the plurality of sensors, which may be coupled to the plurality of sensors optically.

In another embodiment, one or more splitters may be operatively coupled between the wavelength interrogator and two or more fibers, each fiber further comprising a plurality of Fiber Bragg Gratings (FBGs).

Another embodiment encompasses a method of telemetering digital signals from acoustic sensors, including providing a plurality of sensors, each comprising an acoustic sensor and electronics for digitizing an output of the acoustic sensor in accordance with a master clock that develops clock cycles; providing a fiber comprising a plurality of Fiber Bragg Gratings (FBGs) along its length, wherein each of said plurality of FBGs is operatively coupled to a corresponding sensor of the plurality of sensors and each FBG having a Bragg wavelength that varies in an associated wavelength range with strain in the fiber proximate FBG; providing a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles; launching light from a swept wavelength interrogator coupled to an end of the fiber for sending a plurality of wavelengths into the fiber in accordance with the master clock during at least a portion of the particular plurality of successive clock cycles; receiving reflected wavelengths from the plurality of FBGs; and processing the reflected wavelengths to determine a digital signal.

In a further embodiment, the digital signals are telemetered at a 60 kHz transfer rate.

In another embodiment, the master clock establishes a bit period in accordance with a selected data transfer rate.

In any of the above embodiments, each FBG is assigned a nominal wavelength band separated by guard bands.

In any of the above embodiments, reflected wavelengths from the plurality of FBGs are received within the bit period.

In a further embodiment, the launching and receiving steps include measuring the wavelength power spectrum response from all of the reflected wavelengths; and decoding the digital states of each sensor by analyzing the measured wavelength power spectrum.

In yet another embodiment, the processing step includes analyzing the reflected wavelengths in real time to identify wavelength drifts.

DESCRIPTION OF THE DRAWINGS

Some example embodiments will now be described with reference to the accompanying drawings in which.

DETAILED DESCRIPTION

Figure 1:
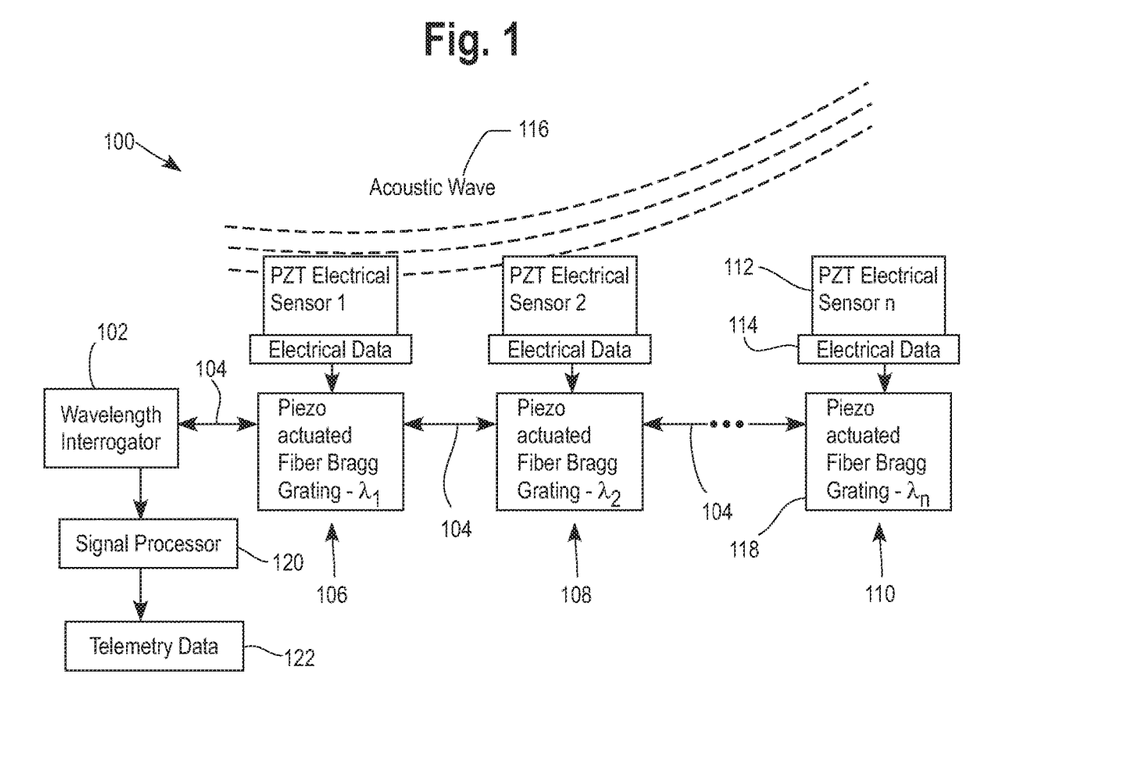
FIG. 1 depicts a block diagram of a combined electronic and optical component acoustic array.

FIG. 1 is a block diagram of an embodiment of an acoustic array 100. A wavelength interrogator 102, containing a broad spectral source and broad spectral receiver (not shown), is coupled to optical fiber 104 which connects an array of acoustic elements 1, 2 . . . n, indicated at 106, 108 and 110, in series. A number of array elements 1, 2 . . . n are spaced along fiber 104. In an embodiment, the spacing between array elements is approximately a few meters although the distance between array elements may be kilometers in length. The system contains a link power budget that can be allocated to either losses in the fiber or to the losses generated by the array elements. In a further embodiment, an acoustic array may include at least 2 and as many as several hundred array elements in the series. Each acoustic element 106, 108, 110 contains an acoustic sensor 112 as indicated, for example, in acoustic element 110. Acoustic sensor 112 may be, for example, a piezoelectric sensor made from lead zirconate titanate (PZT) or a ceramic material, although any material capable of registering acoustic energy may be used. Acoustic sensor 112 is associated with electronics 114 which digitizes the information received by acoustic sensor 112 from acoustic wave 116 by translating it into a voltage signal. Array elements 106 and 108 also include an acoustic sensor and its associated electronics similar to those described for array element 110 as shown in FIG. 1.

Figure 2:
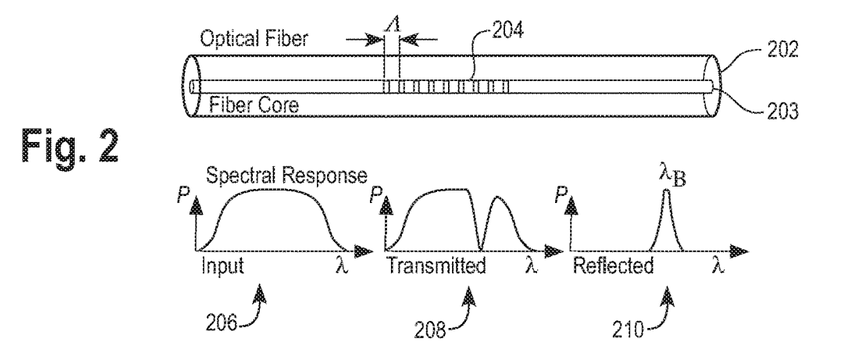
FIG. 2 depicts a representative optical fiber with a fiber Bragg Grating (FBG).

In order to encode the digital signal from electronics 114 onto optical fiber 104 for return to the broad spectral receiver in wavelength interrogator 102, the electrical signal is interfaced with an optical spectral modulator (OSM) 118 of array element 110 based on, for example, a retro-reflective Fiber Bragg Grating (FBG). Although embodiments are described in terms of an FBG, other types of modulating structures that feature high strain sensitivity, minimal element loss, a narrow spectral bandwidth and high reflectivitity may be used. As shown in FIG. 2, an optical fiber 202 has an FBG 204 in the fiber core 203 that may be made by patterning the periodic grating structure 204 along the fiber waveguide in the fiber using UV light or by creating small defects in the glass. By altering the periodic structure, the grating can be designed for particular optical parameters such as the Bragg wavelength $\lambda_B$, passband width, dispersion, etc. For example, an FBG may have a grating length of 5-10 mm, with a spectral width of 0.5 nm. FBG 204 is designed to have a spectral response such that when a broadband spectrum of wavelengths shown at 206 is input to optical fiber 202, most of the spectrum is transmitted on down the fiber as shown at 208 while a portion centered on Bragg wavelength $\lambda_B$ is reflected back to the source as shown at 210. An FBG is very low loss at the non-Bragg (reflected) wavelengths passing through it. In general, the lower the loss of each element in an array, the more elements that can be used in a given link budget.

Referring back to FIG. 1, each array element has an OSM 118 as described for array element 110. Further, each array element 1, 2 . . . n is also assigned a unique Bragg wavelength $\lambda_1, \lambda_2 \ldots \lambda_n$, so that return signals from all of the array elements 1, 2 . . . n are wavelength multiplexed onto fiber 104. At wavelength interrogator 102, a range of wavelengths spanning at least $\lambda_1, \lambda_2 \ldots \lambda_n$ is injected into fiber 104. Return wavelengths that have been reflected by the OSMs are de-multiplexed by acquiring the optical spectrum and demodulated by analyzing the spectral components related to each of the FBGs to recover the digital signals, then further processed in signal processor 120 which outputs telemetry data 122.

A further feature of an FBG is that the reflected wavelength $\lambda_B$ may be shifted slightly by stretching the optical fiber in the vicinity of the FBG. Therefore, the modulation of the reflected wavelengths is performed by an OSM 118 in each acoustic array element comprised of an FBG coupled to a piezo electric fiber stretcher, discussed in more detail below. The fiber stretcher strains the FBG when a voltage proportional to the data signal received at sensor 112 (FIG. 1) is applied, shifting the Bragg wavelength to generate a wavelength shift modulation correlated with the data signal. The applied voltage signal is received from electronics 114 of FIG. 1. This wavelength shift is measured by wavelength interrogator 102 to recover the data.

Figure 3:
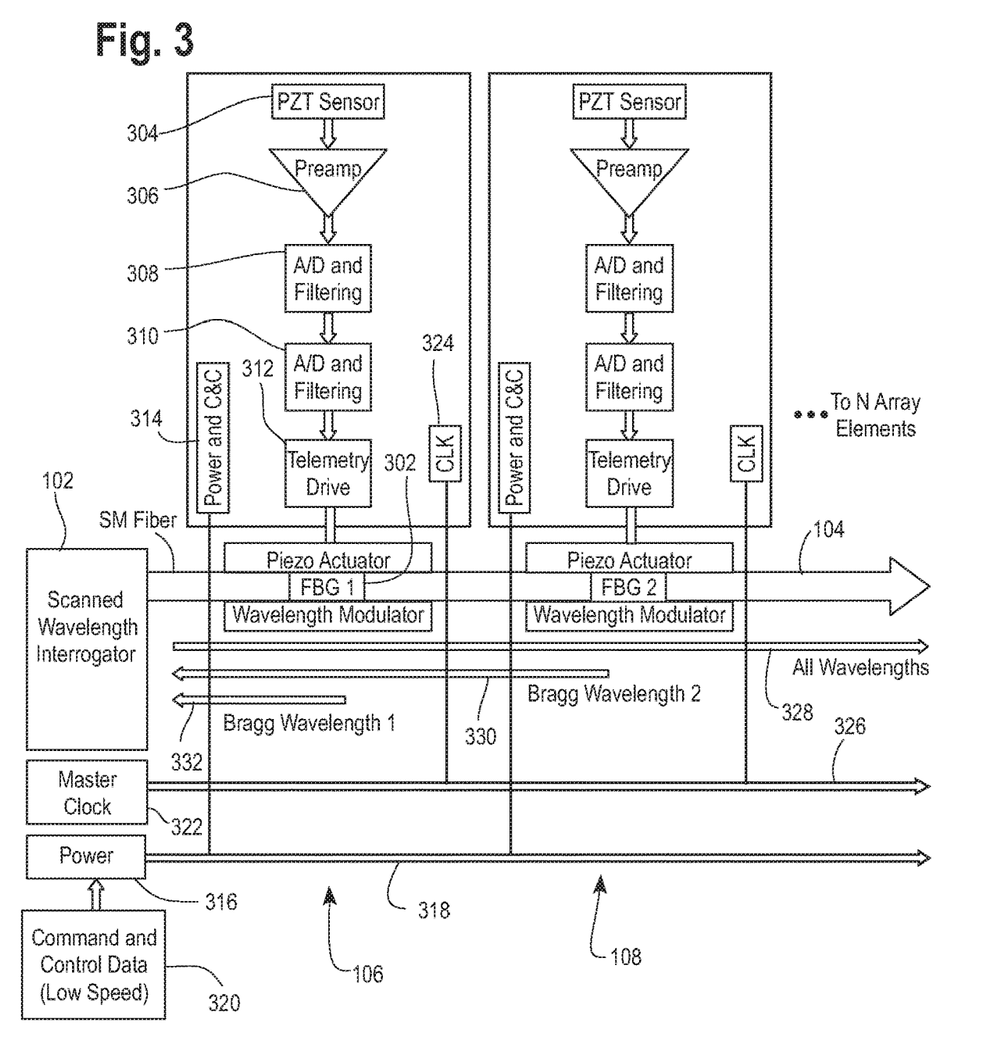
FIG. 3 depicts a more detailed block diagram of the embodiment of FIG. 1.

A more detailed block diagram of the embodiment of FIG. 1 is shown in FIG. 3. Corresponding elements have the same reference numbers. This diagram shows the interaction between two primary optical components: wavelength interrogator 102 and piezo-actuated FBGs 302 of acoustic element 106. The following discussion will refer to element 106 but is equally applicable to element 108 as well as the other array elements not shown. Piezo-actuated FBGs 302 will be discussed in more detail in connection with FIG. 5.

Starting with the incoming acoustic wave in the ocean water, the acoustic wave impinges on the ocean facing PZT acoustic sensor 304, which converts the physical pressure wave into an analog electrical signal. The electrical signal is amplified 306, filtered 308, 310, and digitized 312 within the sensor element electronics with careful attention to maximizing sensitivity and minimizing signal distortion and noise. Although specific processing elements are shown in FIG. 3, this is for illustration purposes only and other elements may be connected in different ways to accomplish the same function.

The output signal from electronic sensing element, a time varying digital voltage, is conditioned and coupled to a piezoelectric actuator that converts the drive voltage into a time varying mechanical strain i.e. a change in length of the material. Piezoelectric actuators are mechanically bonded to optical fiber 104 and transfer a time varying strain proportional to the data signal onto FBG 302. The strain creates a time varying wavelength shift to the Bragg wavelength $\lambda_B$ that is proportional to the data signal as described below. This mechanism is the basis of the electronic to optical conversion (modulation). An integrated FBG modulator 302 forms the interface between acoustic sensor 304 and fiber 104 at a series of N locations along a fiber-optic cable 104.

Wavelength interrogator 102 injects all wavelengths 328 into fiber 104. Each FBG 302 in the series along fiber cable 104 is optically retro-reflective within a very narrow wavelength band selected from $\lambda_1, \lambda_2 \ldots \lambda_n$ shown at 330 and 332 for elements 108 and 106 respectively, and transmits at all other wavelengths. The retro-reflective wavelength band is determined by the grating design, more particularly by the grating periodicity. By choosing the wavelength bands of the FBG's in a manner where they do not overlap, a series configuration in a single fiber cable can be realized. This allows many channels to operate simultaneously on a single fiber in a wavelength division multiplexed (WDM) configuration. This configuration confers very little insertion loss on the light passing through the grating in either direction at each sensor location. Thus, by combining the modulation and add-drop functions, no regeneration is needed to achieve long reach.

The encoded signals reflected from the FBG's return to the head end of the telemetry system. To retrieve the information carried in these time varying, wavelength shifted signals, an optical wavelength interrogator 102 demultiplexes in wavelength and time. In an embodiment, wavelength interrogator 102 scans through the necessary wavelength range to sample the time varying reflected signal at each wavelength.

A power source 316 also provides DC power to all array elements as represented by 106, 108 over bus 318. An outbound low speed Command and Control (C&C) link 320 is also provided over bus 318. The outbound C&C link is used for setting and configuring element operating modes in Power and C&C module 314 in each sensor unit. A return link may be implemented by multiplexing C&C data with the main acoustic telemetry data over fiber 104. The C&C link speed is in the range of 10 kb/s. In one embodiment, bus 318 may utilize electrical transmission line technology, as is used in current undersea cable systems, with the C&C implemented using Power Line Communications (PLC) technology. In another embodiment, an optical-based power distribution scheme such as Power Over Fiber (POF) may be used.

A master clock 322 provides a signal to a clock 324 in each array element over bus 326 which synchronizes the acquisition process to ensure that the relative time delays among the series elements are captured. The master clock signal is used by each array element to align the timing of the transmitter to the receiver, as is normally done in a TDM (time division multiplexing) system.

Figure 4:
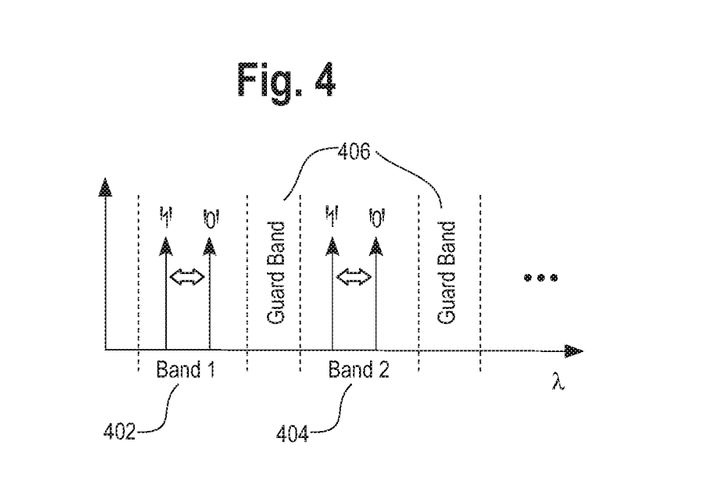
FIG. 4 depicts a wavelength shift detected by the apparatus of FIG. 1.

In an embodiment, individual sensor information from each array element in FIG. 1 or 3 is encoded digitally onto the wavelength $\lambda_n$ assigned to the array element by using a small wavelength shift induced by piezo actuator of the associated array element as shown in FIG. 4. Each array element is assigned a unique nominal wavelength band. For example, array element 106 of FIG. 1 may be assigned band 1 indicated at 402 in FIG. 2 while array element 108 may be assigned band 404 of FIG. 4. Guard bands 406 separate each assigned band. In an embodiment, adjacent wavelength bands may be assigned to adjacent array elements but this is not required. A shown in FIG. 3, the modulation produced by an array element OSM results in a small shift in wavelength within a band, representing a digital 0 or 1.

In an example embodiment, a system of 100 acoustic sensors may each have a 12-bit sampling A/D and an acoustic sensing bandwidth of 2.5 kHz. In the simplest case, there is 1 bit per symbol (i.e. digital on-off keying (OOK) with voltage on or off) and each acoustic sensor places bits on the fiber at a 60 kHz rate. FIG. 4 shows this encoding in the spectral domain with the FBG wavelength channels having been chosen at an appropriate separation and with unique nominal wavelength values. For example, with no fiber strain applied to any of the FBG devices and the wavelength spacing set to 0.5 nm, one would see a spectral response with peaks of each channel at 1500, 1500.5, . . . , 1549.5 nm, corresponding to "0" bits on each channel. In contrast, when strain has been applied to all the FBG elements the wavelengths may be shifted with, for example, a wavelength shift of 30 pm, to 1500.03, 1500.53, . . . , 1549.53 nm respectively, corresponding to a "1" bit on each channel. In real data transfer operation, the wavelength shifts are uncorrelated and the composition of the spectrum would be time varying as each element operates independently.

Master clock 322 of FIG. 3 synchronizes the acquisition process to ensure that the relative time delays among the series elements are captured. In the example above, the period corresponding the 60 kHz data transfer rate is 1/60 kHz=16.17 microseconds. This is the time in which all actuators must actuate the FBG to either the "0" or "1" wavelength state.

At a receiver, all the return wavelengths are received within a system bit window as determined by master clock 322 and are de-multiplexed by a fast scanning wavelength interrogator 102 (FIG. 1). Interrogator 102 is a spectroscopic device and measures the wavelength power spectrum response from all the array elements in the series and decodes the digital states of each element by analyzing the power spectrum. The interrogation occurs once every bit period and the output contains the digital data for the entire array in real time.

Wavelength interrogation may be performed in several ways while meeting the fundamental requirement of measuring across all element spectral bands with sufficient dynamic range during each system bit period. For example, a broadband source with a fast scanning receive filter is one method. A second method would utilize a tunable source and broadband receiver. Although these two examples are discussed, embodiments of the system and method are not limited to these examples. In each case, the wavelength power spectrum of the complete array is sampled once every bit period. Since the acoustic application requires relatively low (kilohertz) speeds, scanning methods using various tunable technologies are realizable over wide spectral ranges.

Wavelength interrogator 102 (FIGS. 1, 3) scans through the full wavelength range once every clock cycle and each sensor puts the proper voltage (symbol) onto its actuator/FBG device prior to interrogation. Once the reflected light from the sensor at a given wavelength is detected a high speed digitizer that is time-synced with the filter measures the received intensity. This measurement technique is a time to wavelength converter and measures the intensity vs. wavelength relationship. The collected power spectrum from the scan is then analyzed to extract the wavelength encoded data. The wavelength peaks are determined by use of a suitable algorithm. The locations of these peaks are then demodulated into logical 0's and 1's in parallel. For the purposes of data telemetry in a undersea acoustic environment, for example, the maximum bit rate requirement is equal to the maximum acoustic frequency sought to be detected multiplied by the sampling resolution (bits/sample) *the oversampling rate (to meet the Nyquist criteria usually 2-2.5). In an embodiment, the system of FIG. 1 is intended to detect acoustic energy at up to 2.5 kHz acoustic bandwidth and 16 bit resolution therefore, an 80 kHz transmission rate is required for simple digital coding. This bit rate can be reduced by using higher symbol count coding and high spectral resolution in the interrogator.

If the piezoactuator uses multiple different levels, allowing for a richer constellation of symbols, more bits can be transferred per interrogation. For example, 2 bits per symbol could yield 00, 01, 10, or 11 may be used. Using more symbols would also reduce the system bit rate. However, the increase in symbol count would increase the resolution requirement of the interrogator in order to resolve more symbols at the same SNR. For example, if the minimal resolvable wavelength shift is 0.5 pm, and a 32 pm maximum shift may be generated using the piezoactuator and the power available, then the FBG can be set to 64 states, allowing for 6 bits (ignoring noise for the moment). On the other hand if the minimum resolvable shift is 2 pm, then each symbol can only encode 4 bits. Assuming in both cases that any symbol is equally likely, the mean energy across many cycles is identical, but the former case produces 50% more bits for the same actuator energy.

The dynamic range requirement of the wavelength interrogator 102 (FIG. 1) is driven by the number of elements in the array and the total loss of the optical fiber (0.2 dB/km). In a series array the ability to resolve the last element in the series is limited by the double pass signal loss in each element. Bragg gratings reflect a narrow range of wavelengths which satisfy or nearly satisfy the "Bragg condition"; this range is less than a nanometer for typical gratings used in telecommunications systems. For wavelengths far from the Bragg condition, a typical single pass loss is 0.10 dB, so a 100 element series would require an interrogator with approximately 20 dB (100*0.1 dB*2 passes) dynamic range.

The requirements for a wavelength interrogator operating with two symbol states are an approximately 20-200 kHz scan rate, an approximately 10-50 dB dynamic range, and resolution of picometers over the full band. In an embodiment, a wavelength interrogator operates with an 80 kHz scan rate and a 20 dB dynamic range. If multiple symbols are chosen in wavelength space, the scan rate could be reduced since multiple symbols are transmitted per bit period.

In an embodiment, a wavelength interrogator similar to the Hyperion® model x55 from Micron Optics®, Inc. may be used in the system of FIG. 1. This wavelength interrogator is a swept wavelength interrogator with a sweep speed, or scan rate, of at least 5 kHz with 17 dB dynamic range and 2 pm resolution over an 80 nm band. In an alternative embodiment, a wavelength interrogator with a reduced scan band and resolution would enable higher scan rate and dynamic range. Any wavelength interrogator or high speed spectrometer meeting the performance criteria described herein may be used.

An advantage of a real-time scanning interrogation method is that an absolute wavelength referencing between the array elements and the interrogator is not required. This enables using DSP (digital signal processing) techniques to compensate for environmentally induced wavelength drifts in the FBG sensors. In a conventional non-scanning system, wavelength misalignment due to environmental effects between the FBG sensors and fixed optical receive filters results in the requirement to stabilize the wavelengths. When using scanning interrogation, the post processed data can be analyzed in real time to identify slow wavelength drifts and the interrogator can compensate for the wavelength shifts.

Figure 5:
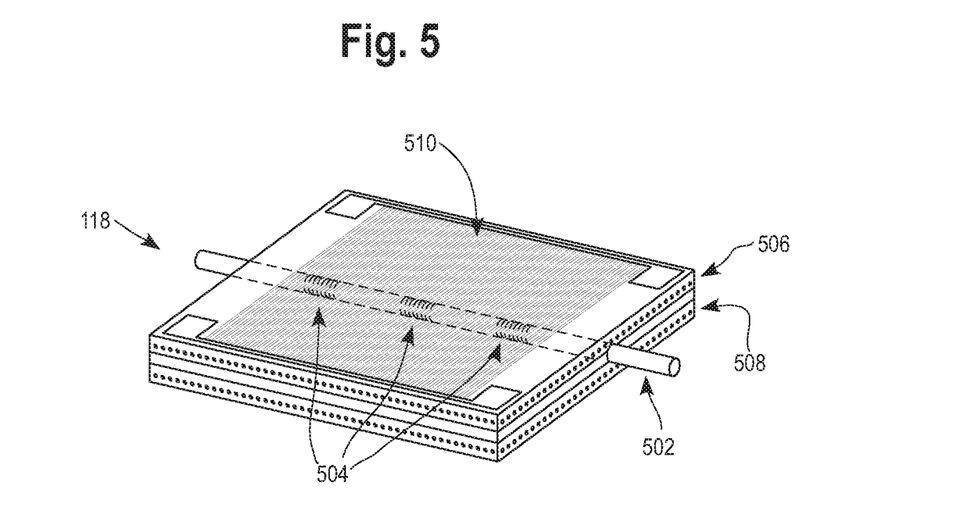
FIG. 5 depicts an optical spectral modulator (OSM) for use in the array of FIG. 1.

A more detailed diagram of OSM 118 of FIG. 1 is shown in FIG. 5. OSM 118 includes a fiber 502 with FBG 504. An upper Macro Fiber Composite (MFC) actuator 506 and a lower MFC actuator 508 combine to apply strain to FBG grating 504. The FBG is mechanically coupled to the piezoelectric actuators 506 and 508. When a voltage is applied via electrode 510, the piezo effect causes FBG 504 to be strained, which shifts the retro-reflected Bragg wavelength. This wavelength shift is then correlated with the input electrical signal and is used to encode the data. Although a planar fiber optic strain-tuned device is shown in FIG. 5, an alternative embodiment may use a cylindrical piezoelectric fiber composite (CPFC) Actuator.

In an embodiment, an actuator for use in OSM 118 has low applied voltage for longitudinal extension, low total power dissipation, and kHz response speed. For example, a linear actuator from Piezo Systems®, Inc., part number D220-A4-103 may be used. This actuator is approximately 25×4×2 mm in size with resonant frequency of 24 kHz, 13 nF of capacitance, and takes 90V to extend 3.6 um.

The shift in Bragg wavelength in the FBG is proportional to the strain applied. In an embodiment, the strain scaling per volt may be approximately 3.6 um/25 mm/90V=1.6e-6 per volt which, when multiplied by a nominal wavelength, 1550 nm, yields 2.5 pm/Volt applied. For a system using 10 pm wavelength shifts this requires 4 volts at 2.5 pm/Volt. These values are for illustration purposes only and other scaling and wavelength values may be used.

The total power consumption can be calculated by modelling the actuator as a capacitor where the total energy for one cycle is given by $$E = \frac{1}{2} \times \text{capacitance} \times V_{applied}^2$$

The total energy per cycle is then $$E = \frac{1}{2} \times 13 \; nF \times 4V^2$$

In the embodiment described above the total energy used per cycle in a single FBG is 100 nJ. Total power then can then be calculated by multiplying by system speed (cycles/sec). At a system speed of 80 kHz, the total is then 100 nJ*80 kHz=8 mW. In the small signal range, excess losses are typically an additional 1-2%.

The maximum switching speed is limited by the resonant frequency of the piezo structure. To achieve higher operating speeds the piezo actuator material and geometry may be optimized to increase the resonance frequency. Factors affecting the speed of operation of the acoustic array of FIG. 1 may be derived from considering the wavelength plan, modulation scheme, and details of the interrogation method.

Figure 6:
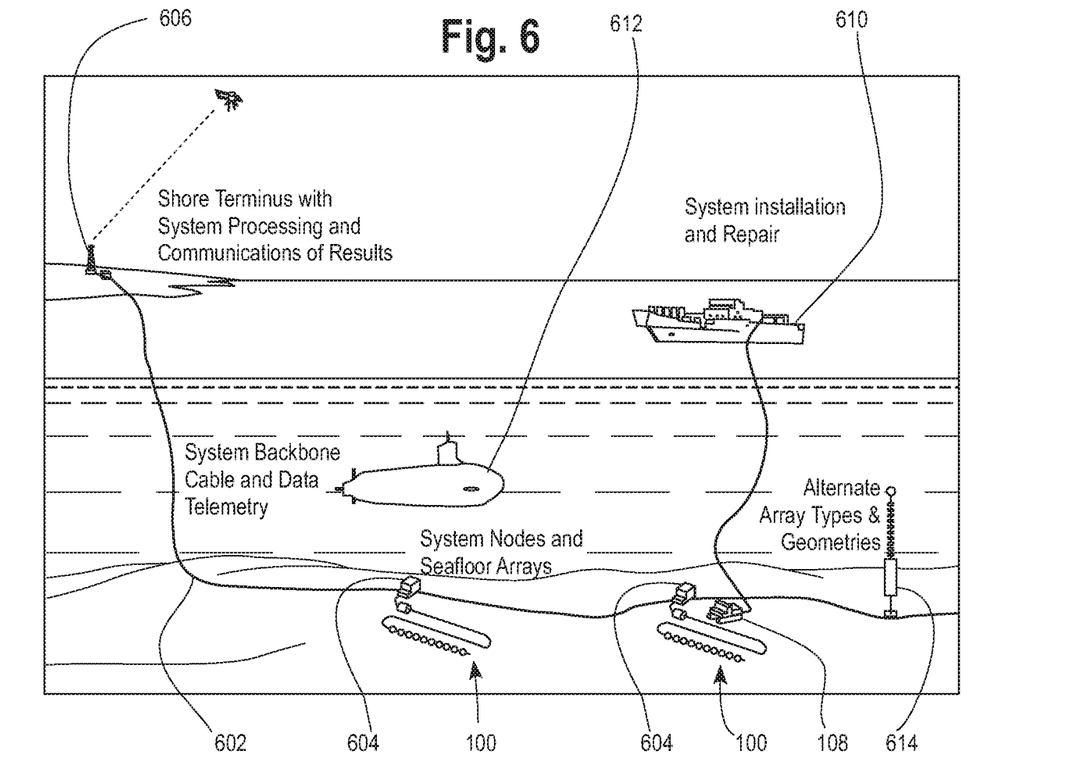
FIG. 6 depicts the acoustic array of FIG. 1 in an undersea implementation.

The acoustic array of FIG. 1 may be used in an undersea environment as shown, for example, in FIG. 6. In an embodiment, acoustic arrays 100 are attached to a main trunk line 602 using an interconnect 604 that provides two-way communication along with power to sensor arrays 100. Interconnect 604 sends retrieved array data from sensor arrays 100 to shore via a high capacity trunk line 602, which also provides a low bandwidth control data link from the shore control station 606 out to arrays 100. This control data is used to configure arrays 100 as needed, for example to optimize for power management or array performance. The scalability in element count, element spacing, and standoff distances determine the complexity of networks that can be implemented and the operational capabilities that can be undertaken using resource allocation algorithms according to operational priorities. Installation and maintenance may be accomplished in a variety of ways, including, for example, robot 608 controlled remotely by surface or undersea vehicles, represented at 610 and 612 respectively. In addition to arrays 100, alternate array types and geometries 614 may also be connected to trunk line 602.

The proposed method is fully compatible with optical communications technologies which can be multiplexed onto the same cable for future data telemetry requirements. Any signal at a different wavelength from the FBG wavelengths will pass through the system. Therefore adding or removing signals to the fiber can be done anywhere along the array.

In an embodiment, the system may have one laser in the interrogator. The FBG is a passive optical structure with very long life. The piezoelectrics have been shown to be very high reliability (used in space). By minimizing low reliability active components, using passive retro-reflective components, and simplifying the network architecture, the reliability will be very high for the proposed approach.

In further embodiments, the OSM's may be arranged in numerous variations. Given a fixed number of elements, it is optimal to find an array configuration that minimizes the total required power such that the received power from every element meet a minimum SNR threshold. In the following discussion, all quantities are representative of an example embodiment, not limitations on the invention. In an embodiment, consider an array with N=128 elements, a laser power of 20 dBm in the interrogator, and a minimal received power of −30 dBm with a required signal-to-noise ratio (SNR) of 1 and a dynamic range of 50 dB. Further, consider that each FBG along the cable has a 0.25 dB loss each way, or a 0.5 dB round-trip loss. Cable length losses are typically around 0.2 dB/km which is negligible in this analysis.

The wavelength interrogator can be implemented in many ways. In the simplest case, it may have multiple channels each functioning independently, and each scanning through the same wavelength range. Another, more sophisticated implementation, uses wavelength multiplexing in which a channel scans through multiple sub-bands simultaneously. Upon reception, a de-multiplexer scans the sub-bands.

Figure 7A:
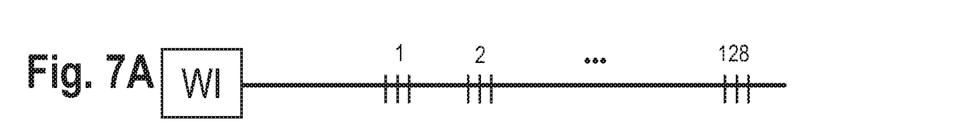
FIGS. 7A-7C depict alternative configurations for the array of FIG. 1.

In the non-multiplexed embodiment, the simplest case is to have a single fiber with 128 FBG's. In this hypothetical example, illustrated in FIG. 7A, the last element sees 0.5 dB*128=64 dB of loss, which is greater than the available dynamic range.

Figure 7B:
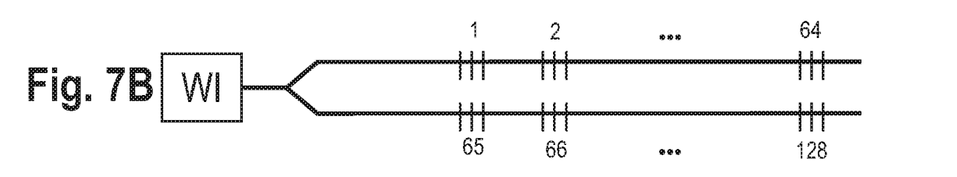
Figure 7C:
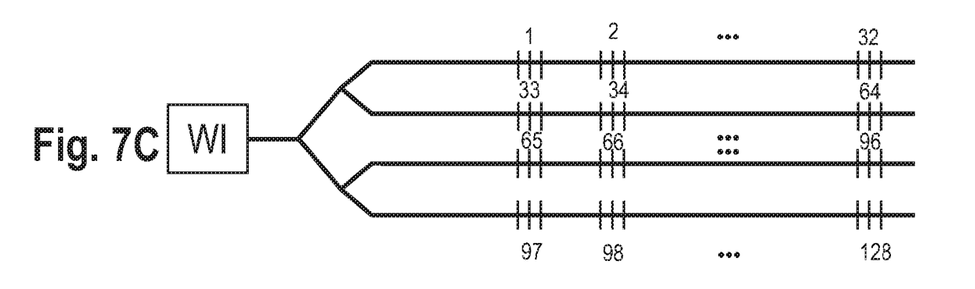

An alternative embodiment, illustrated in FIG. 7B, uses a splitter to divide the outgoing light between two fibers, each with 64 elements. In this embodiment the splitter yields a 6 dB loss in each array (3 dB out and 3 dB back), along with some efficiency loss of approximately 1 dB. Thus each array suffers a 7 dB penalty and the $64^{th}$ and $128^{th}$ array elements each see 7+0.5*64 dB=39 dB of loss, significantly improved from 64 dB of loss. If each of these arrays was split as shown in FIG. 7C, then there would be 4 arrays with 32 elements each, with each array suffering 14 dB of loss (having gone through two 7 dB splits). Therefore, the $32^{nd}$ element of each array would require 30 dB of dynamic range.

In other alternative embodiments, high speed optical communications technologies may be carried on other system wavelengths in the same optical fiber used for array data telemetry. Additional array elements may be accommodated by changing the spectrum of the wavelength interrogator.

If used and unless otherwise stated, the terms "upper," "lower," "front," "back," "over," "under," and similar such terms are not to be construed as limiting embodiments to a particular orientation. Instead, these terms are used only on a relative basis.

What is claimed is:

1. A system, comprising:
    a plurality of sensors, each comprising an acoustic sensor and electronics for digitizing an output of the acoustic sensor in accordance with a master clock that develops clock cycles;
    a fiber comprising a plurality of Fiber Bragg Gratings (FBGs) along its length, wherein each of said plurality of FBGs is operatively coupled to a corresponding sensor of the plurality of sensors and each FBG having a Bragg wavelength that varies in an associated wavelength range with strain in the fiber proximate the FBG;
    a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles; and
    a swept wavelength interrogator coupled to an end of the fiber for sending a plurality of wavelengths into the fiber and receiving reflected wavelengths from the plurality of FBGs in accordance with the master clock during at least a portion of the particular plurality of successive clock cycles.

2. The system of claim 1, wherein the master clock defines a bit period wherein a wavelength power spectrum of all of the plurality of FBGs is sampled.

3. The system of claim 1 wherein the acoustic sensor further comprises a piezoelectric sensor.

4. The system of claim 1, wherein each FBG is assigned a nominal wavelength band separated by guard bands.

5. The system of claim 1 wherein the plurality of sensors comprises at least 100 sensors.

6. The system of claim 1 wherein the swept wavelength interrogator has a sweep speed of at least 5 kHz.

7. The system of claim 1 further comprising a power source coupled to the plurality of sensors.

8. The system of claim 7 wherein the power source is coupled to the plurality of sensors optically.

9. The system of claim 1 wherein the plurality of sensors are located in an undersea environment.

10. The system of claim 1 further comprising one or more splitters operatively coupled between the wavelength interrogator and two or more fibers, each fiber further comprising a plurality of Fiber Bragg Gratings (FBGs).

11. An undersea acoustic sensing system comprising:
a shore control station;
an undersea main trunk line operatively coupled to the shore control station; and
a plurality of interconnect units operatively coupled between said undersea main trunk line and a sensor array, said sensor array further comprising:
  a plurality of sensors, each comprising an acoustic sensor and electronics for digitizing an output of the acoustic sensor in accordance with a master clock that develops clock cycles;
  a fiber comprising a plurality of Fiber Bragg Gratings (FBGs) along its length, wherein each of said plurality of FBGs is operatively coupled to a corresponding sensor of the plurality of sensors and each FBG having a Bragg wavelength that varies in an associated wavelength range with strain in the fiber proximate the FBG;
  a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles; and
  a swept wavelength interrogator coupled to an end of the fiber for sending a plurality of wavelengths into the fiber and receiving reflected wavelengths from the plurality of FBGs in accordance with the master clock during at least a portion of the particular plurality of successive clock cycles.

12. The system of claim 11, wherein the master clock defines a bit period wherein a wavelength power spectrum of all of the plurality of FBGs is sampled.

13. The system of claim 11, said sensor array further comprising one or more splitters operatively coupled between the wavelength interrogator and two or more fibers, each fiber further comprising a plurality of Fiber Bragg Gratings (FBGs).

14. A method of telemetering digital signals from acoustic sensors, comprising:
providing a plurality of sensors, each comprising an acoustic sensor and electronics for digitizing an output of the acoustic sensor in accordance with a master clock that develops clock cycles;
providing a fiber comprising a plurality of Fiber Bragg Gratings (FBGs) along its length, wherein each of said plurality of FBGs is operatively coupled to a corresponding sensor of the plurality of sensors and each FBG having a Bragg wavelength that varies in an associated wavelength range with strain in the fiber proximate the FBG;
providing a plurality of piezoelectric actuators each associated with a corresponding FBG of the plurality of FBGs for straining the corresponding FBG according to a digitized output of the electronics of the sensor operatively coupled to the FBG to develop at least one data bit representing the Bragg wavelength of the associated FBG during at least one clock cycle of a particular plurality of successive clock cycles;
launching light from a swept wavelength interrogator coupled to an end of the fiber for sending a plurality of wavelengths into the fiber in accordance with the master clock during at least a portion of the particular plurality of successive clock cycles;
receiving reflected wavelengths from the plurality of FBGs; and
processing the reflected wavelengths to determine a digital signal.

15. The method of claim 14, wherein the digital signals are telemetered at a 60 kHz transfer rate.

16. The method of claim 14, wherein the master clock establishes a bit period in accordance with a selected data transfer rate.

17. The method of claim 16, wherein each FBG is assigned a nominal wavelength band separated by guard bands.

18. The method of claim 16, wherein reflected wavelengths from the plurality of FBGs are received within the bit period.

19. The method of claim 14, wherein the launching and receiving steps further comprise:
  measuring the wavelength power spectrum response from all of the reflected wavelengths; and
  decoding the digital states of each sensor by analyzing the measured wavelength power spectrum.

20. The method of claim 14, wherein the processing step further comprises analyzing the reflected wavelengths in real time to identify wavelength drifts.

* * * * *